(12) United States Patent
Boyle (10) Patent No.: US 9,058,397 B1
(45) Date of Patent: *Jun. 16, 2015

(54) QUICK RESPONSE CODE BUSINESS CARD

(71) Applicant: Joingo, LLC, San Jose, CA (US)

(72) Inventor: Stephen S. Boyle, Lincoln, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/070,435

(22) Filed: Nov. 1, 2013

Related U.S. Application Data

(63) Continuation of application No. 13/757,848, filed on Feb. 3, 2013, now Pat. No. 8,573,499.

(60) Provisional application No. 61/594,901, filed on Feb. 3, 2012.

(51) Int. Cl.
*G06K 19/00* (2006.01)
*G06F 17/30* (2006.01)
*G06K 19/06* (2006.01)

(52) U.S. Cl.
CPC .... *G06F 17/30879* (2013.01); *G06K 19/06037* (2013.01)

(58) Field of Classification Search
USPC .................................. 235/435, 439, 454, 462
See application file for complete search history.

(56) References Cited

U.S. PATENT DOCUMENTS

| 7,988,037 | B2 | 8/2011 | Yach |
| 8,157,161 | B2 | 4/2012 | Yach |
| 8,573,499 | B1 * | 11/2013 | Boyle ...................... 235/462.09 |
| 2011/0101086 | A1 * | 5/2011 | Yach .............................. 235/375 |
| 2012/0234907 | A1 | 9/2012 | Clark et al. |
| 2012/0286030 | A1 | 11/2012 | Lee et al. |

* cited by examiner

*Primary Examiner* — Matthew Mikels
(74) *Attorney, Agent, or Firm* — Clause Eight IPS; Michael Catania (57) ABSTRACT

A business card having a QRC image, and method and system for transferring business card information from a QRC to a mobile communication device is disclosed herein. A SMS message comprising contact data for a business is sent from a QRC server to the mobile communication device, which results in pop-up display on the mobile communication device. The pop-up display includes a V-card for the business.

4 Claims, 10 Drawing Sheets

QUICK RESPONSE CODE BUSINESS CARD

CROSS REFERENCES TO RELATED APPLICATIONS

The Present Application is a continuation application of U.S. patent application Ser. No. 13/757,848, filed on Feb. 3, 2013, which claims priority to U.S. Provisional Patent Application No. 61/594,901, filed on Feb. 3, 2012, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to a business card having a QR code. More specifically, the present invention relates to a method and system for transferring information to a mobile phone from a business card with a QR code.

2. Description of the Related Art

Quick reader codes ("QRC") are two dimensional codes comprising data. The actual code comprises a square with black modules arranged in various patterns. Hara et al., U.S. Pat. No. 5,726,435 for an Optically Readable Two-Dimensional Code And Method And Apparatus Using The Same has been credited with being one of the first, if not the first patent for QRC. Hara et al., discloses the basic mechanism for retrieving data from the QRC.

Yach, U.S. Pat. No. 7,988,037 for a Device And Method For Contact Information Exchange discloses using a QRC on a business card to transfer information to a mobile telephone.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

BRIEF SUMMARY OF THE INVENTION

One aspect of the present invention is a method for transferring business card information. The method includes reading a QRC image on a business card with a QRC scanner application on a mobile communication device. The QRC image comprises contact data for the business. The method also includes uploading the contact data for the business to the contact section of the mobile communication device. A business card mobile application on the mobile communication device retrieves the contact data for the business directly from the QRC image.

Another aspect of the present invention is a business card comprises a body with a first surface and a second surface, and a QRC image. The first surface comprises text and graphics with a contact name, a contact title, a business name, a business address, a business phone number, and a business email. The second surface comprises a QRC image for the business card. The QRC image comprises means for uploading contact data for the business card through use of a QRC scanner. The contact data comprises contact name, a contact title, a business name, a business address, a business phone number, and a business email.

Yet another aspect of the present invention is a system for transferring business card information. The system comprises a mobile communication device with a QRC scanner application and a business card with a QRC image. The business card comprises text and graphics with a contact name, a contact title, a business name, a business address, a business phone number, and a business email, and the QRC image comprises means for uploading contact data for the business card through use of a QRC scanner. The contact data comprises contact name, a contact title, a business name, a business address, a business phone number, and a business email.

Yet another aspect of the present invention is a method for transferring business card information from a QRC to a mobile communication device. The method includes reading a QRC image on a business card with a mobile communication device. The QRC image comprises contact data for the business. The method also includes generating a HTTP get request for a web page in a web browser of the mobile communication device. The HTTP get request generated from reading the QRC image. The method also includes transmitting the web page from a QRC server to the web browser of the mobile communication device. The method also includes transmitting the phone number of the mobile communication device to the QRC server. The method also includes transmitting a SMS message to the mobile communication device from the QRC server. The SMS message comprises the contact data for the business. The method also includes saving the contact data for the business in a contact file of the mobile communication device.

Yet another aspect of the present invention is a method for transferring business card information. The method includes reading a QRC image on a business card with a QRC scanner application on a mobile communication device. The QRC image comprises contact data for the business. The method also includes generating a HTTP get request for a web page in a web browser of the mobile communication device. The method also includes transmitting the web page to the web browser of the mobile communication device. The web page having an input block for inputting a phone number of the mobile communication device. The method also includes inputting the phone number into the input block of the web page. The method also includes generating a save command for the web page. The method also includes placing a cookie on the web browser of the mobile communication device. The cookie comprises the phone number of the mobile communication device. The method also includes transmitting the phone number of the mobile communication device to a QRC server. The method also includes transmitting a SMS message to the mobile communication device from the QRC server. The SMS message comprises the contact data for the business. The method also includes generating a pop-up on a display of the mobile communication device. The pop-up comprises a V-card for the business. The method also includes saving the V-card in a contact file of the mobile communication device.

The method further includes reading a QRC image on a second business card with the QRC scanner application on the mobile communication device. The QRC image comprises contact data for the second business. The method further includes generating a HTTP get request for a web page in a web browser of the mobile communication device. The method further includes transmitting the web page to the web browser of the mobile communication device. The method further includes transmitting the phone number of the mobile communication device to the QRC server. The method further includes transmitting a second SMS message to the mobile communication device from the QRC server, the second SMS message comprising the contact data for the second business. The method further includes generating a pop-up on a display of the mobile communication device, the pop-up comprising a second V-card for the second business. The method further includes saving the second V-card in a contact file of the mobile communication device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
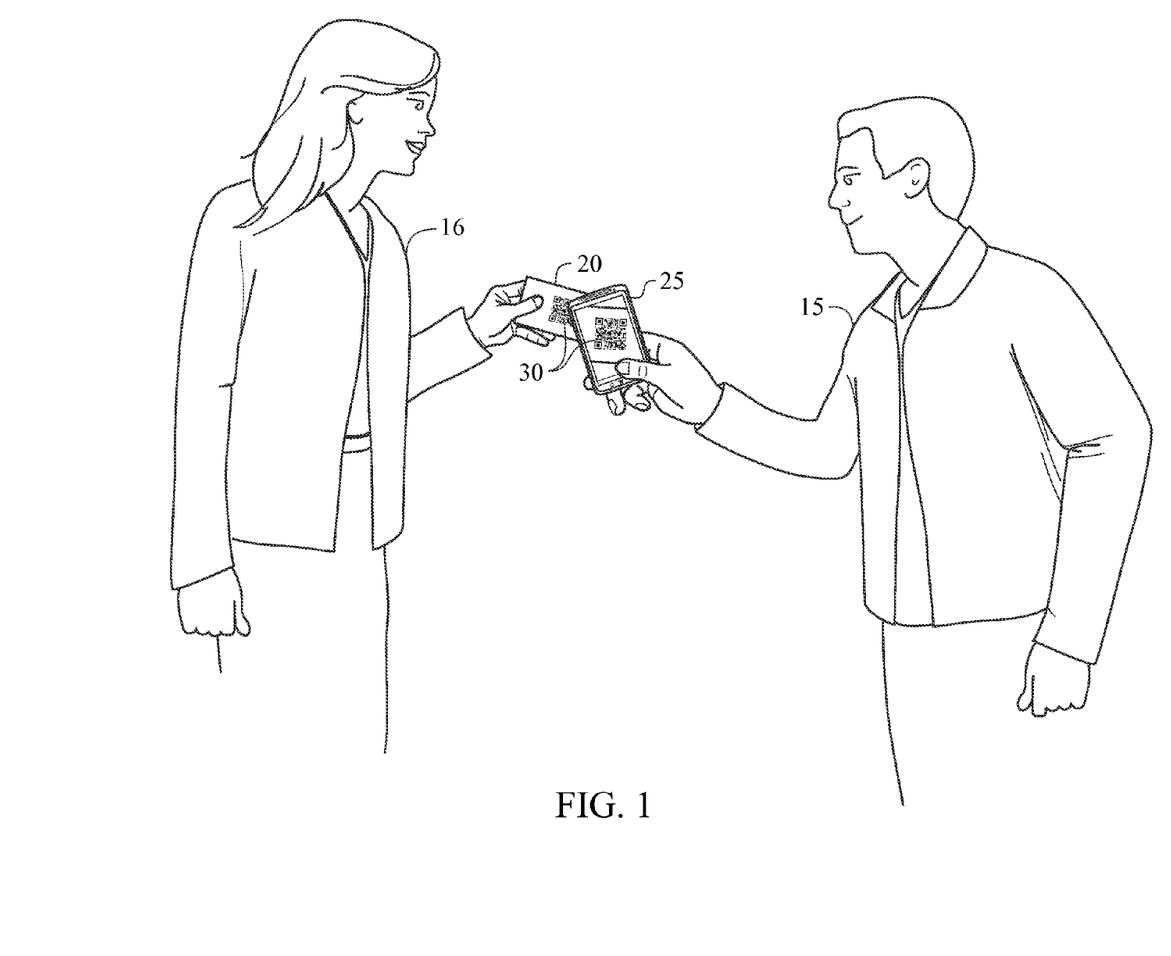
FIG. 1 illustrates an interaction between two people wherein a business card with a QRC is scanned by a mobile phone camera in order to obtain the contact information from the business card.

As shown in FIG. 1, a first person 16 has a business card 20 with a QR code image 30. The QR code image preferably comprises contact name, a contact title, a business name, a business address, a business phone number, and a business email. The second person 15 uses a mobile communication device 25 with a camera to scan the QR code image, and using a mobile application on the mobile communication device 25, obtain the contact information from the business card 30 into a contacts file of the mobile communication device 25.

Figure 2:
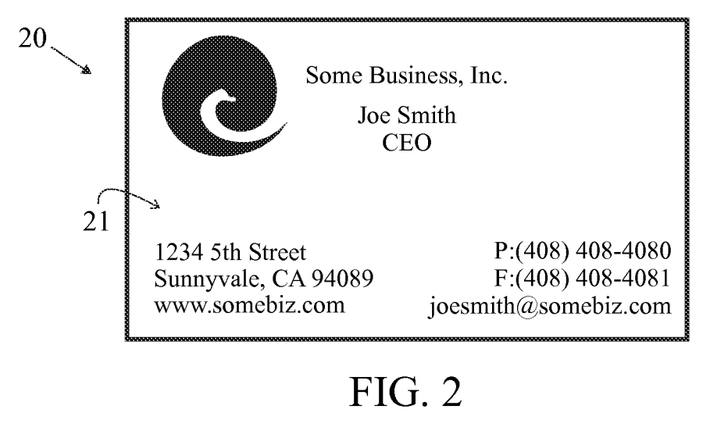
FIG. 2 is an image of a front of a business card with a QRC image on a back side of the business card.
Figure 2A:
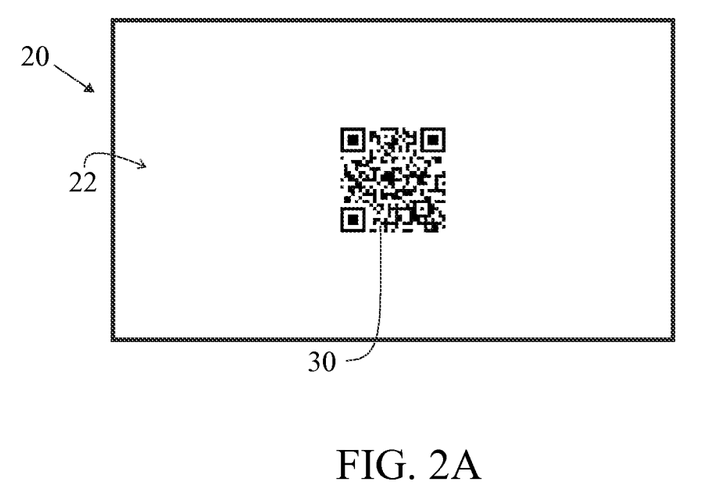
FIG. 2A is an image of a rear of a business card with a QRC image on a back side of the business card.

As shown in FIGS. 2 and 2A, a business card 30 has a first side 21 with traditional information such as an address, name, telephone number and logo. The business card 30 also has a second side 22 with a QR code image 30.

Figure 10:
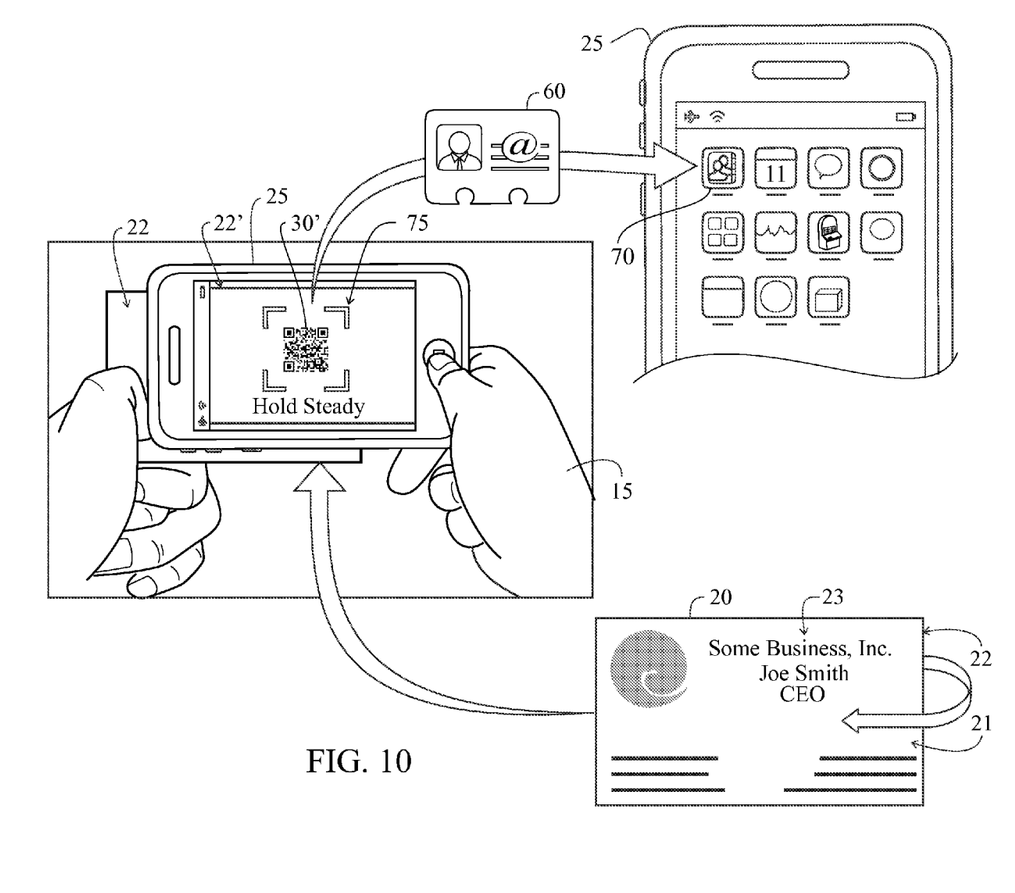
FIG. 10 is illustrates an upload of contact data directly from the QRC image of the business card to a mobile communication device.

As shown in FIG. 10, in a preferred embodiment, contact data is uploaded directly from the QR code image 30 of the business card 20 to a mobile communication device 25. In the scanner application 75 of the mobile communication device 25, an image 22' of the back side 22 of the business card 20 along with an image 30' of the QR code image 30. V card data 60 is transferred to the contacts 70 of the mobile communication device 25.

In an alternative embodiment, a website is accessed on a web browser of a mobile communication device through a URL decoded from a QRC image of the business card in order to upload contact data for a business.

In an alternative embodiment, a website is accessed on a web browser of a mobile communication device through a URL decoded from a QRC image of the business card, and a SMS or MMS is sent to the mobile communication device in order to provide the contact data for the business.

The mobile communication devices utilized with the present invention preferably include mobile phones, smart-phones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTPS, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") Hypertext Transfer Protocol Secure ("HTTPS") or other similar protocols. The transmission protocol ranges from SIP to MGCP to FTP and beyond. The protocol at the server is preferably HTTP.

A mobile communication service provider (aka phone carrier) of the customer such as VERIZON, AT&T, SPRINT, T-MOBILE, and the like mobile communication service providers, provide the communication network for communication to the data capable communication device of the customer.

Figure 3:
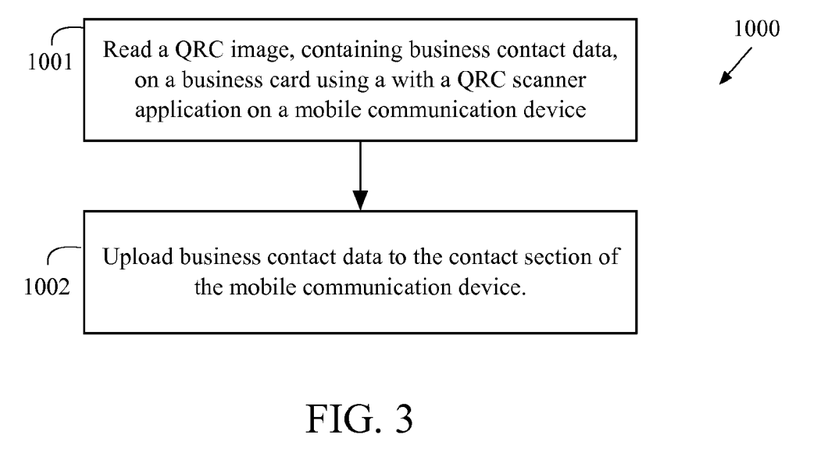
FIG. 3 is a flow chart for obtaining contact information from a business card with a QRC to a mobile communication device.

FIG. 3 illustrates a flow chart for a method 1000 for obtaining contact information from a business card with a QRC to a mobile communication device. At block 1001, a camera of a mobile communication device reads a QRC image on a business card using a QRC scanner application on the mobile communication device. The QRC image comprises contact data for the business. At block 1002, the contact data for the business is uploaded to the contact section of the mobile communication device.

Figure 4:
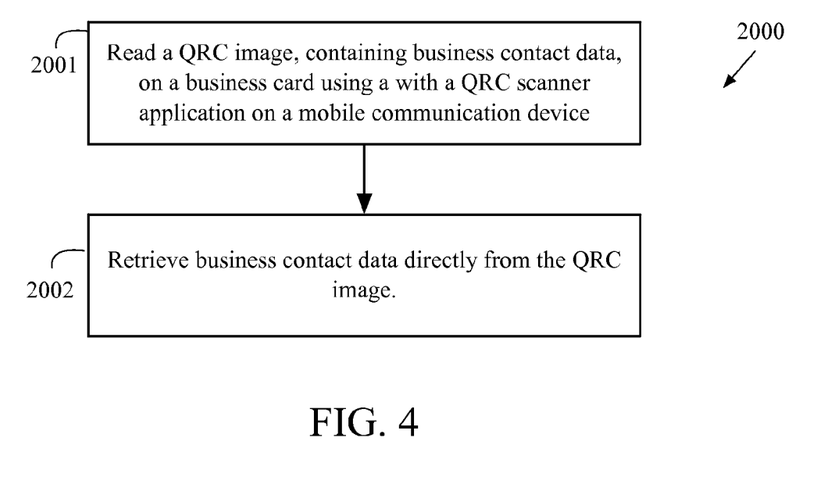
FIG. 4 is a flow chart for obtaining contact information from a business card with a QRC to a mobile communication device.

FIG. 4 illustrates a flow chart for a method 2000 for obtaining contact information from a business card with a QRC to a mobile communication device. At block 2001, a camera of a mobile communication device reads a QRC image on a business card using a QRC scanner application on the mobile communication device. The QRC image comprises contact data for the business. At block 2002, the contact data for the business is directly obtained from the QRC image and transferred to the contact section of the mobile communication device.

Figure 5:
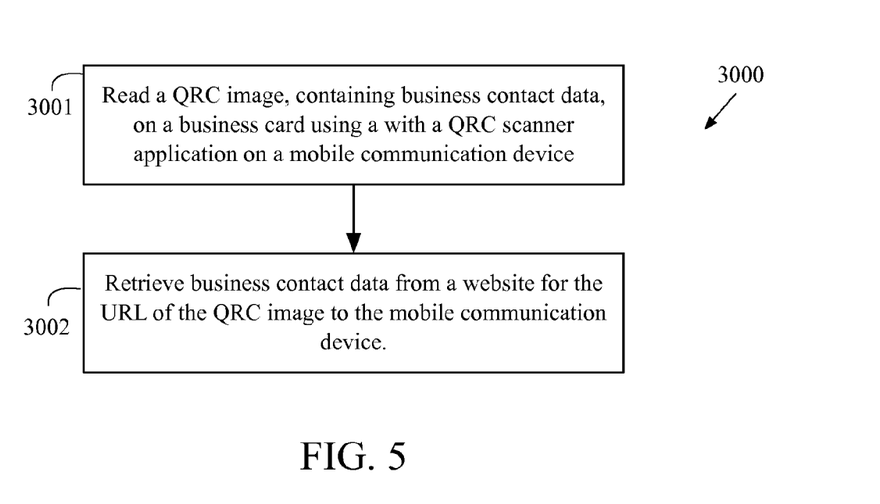
FIG. 5 is a flow chart for obtaining contact information from a business card with a QRC to a mobile communication device.

FIG. 5 illustrates a flow chart for a method 3000 for obtaining contact information from a business card with a QRC to a mobile communication device. At block 3001, a camera of a mobile communication device reads a QRC image on a business card using a QRC scanner application on the mobile communication device. The QRC image comprises URL for the business. At block 3002, a request is sent from the mobile communication device over a network/Internet to the website represented by the URL. The website transmits contact data, or other data, over the network/Internet to the mobile communication device. The contact data for the business is then transferred to the contact section of the mobile communication device.

Figure 6:
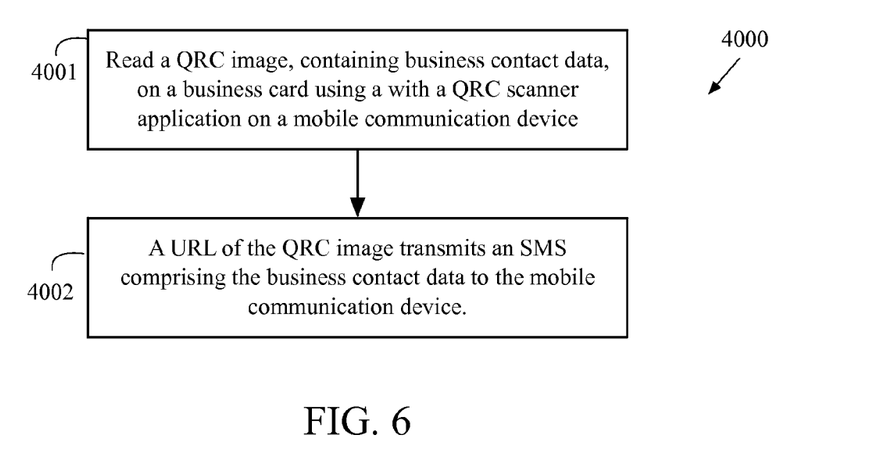
FIG. 6 is a flow chart for obtaining contact information from a business card with a QRC to a mobile communication device.

FIG. 6 illustrates a flow chart for a method 4000 for obtaining contact information from a business card with a QRC to a mobile communication device. At block 4001, a camera of a mobile communication device reads a QRC image on a business card using a QRC scanner application on the mobile communication device. The QRC image comprises URL for the business. At block 4002, a request is sent from the mobile communication device over a network/Internet to the website represented by the URL. The website transmits a SMS with the contact data, or other data, over a communications network to the mobile communication device. The contact data for the business is then transferred to the contact section of the mobile communication device.

Figure 7:
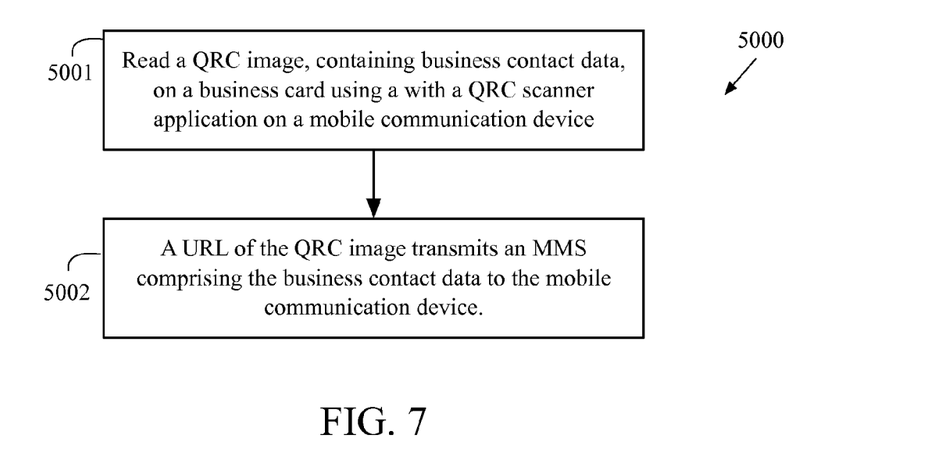
FIG. 7 is a flow chart for obtaining contact information from a business card with a QRC to a mobile communication device.

FIG. 7 illustrates a flow chart for a method 4000 for obtaining contact information from a business card with a QRC to a mobile communication device. At block 4001, a camera of a mobile communication device reads a QRC image on a business card using a QRC scanner application on the mobile communication device. The QRC image comprises URL for the business. At block 4002, a request is sent from the mobile communication device over a network/Internet to the website represented by the URL. The website transmits a MMS with the contact data, or other data, over a communications network to the mobile communication device. The contact data for the business is then transferred to the contact section of the mobile communication device.

Figure 8:
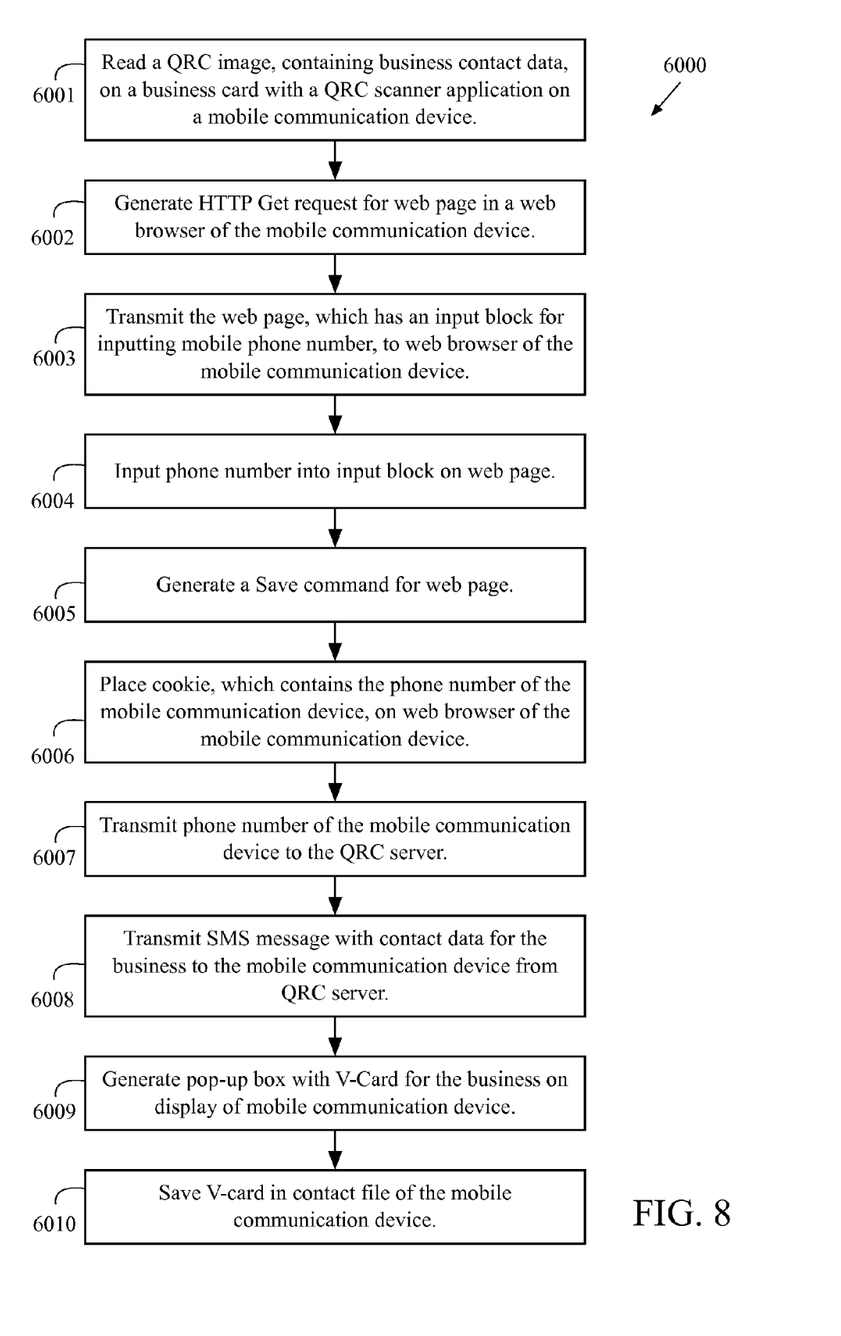
FIG. 8 is a flow chart for obtaining contact information from a business card with a QRC to a mobile communication device.

A flow chart of a method 6000 for transferring business card information is shown in FIG. 8. At block 6001, a QRC image on a business card is read with a QRC scanner application on a mobile communication device. The QRC image comprises contact data for the business. At block 6002, a HTTP get request for a web page is generated in a web browser of the mobile communication device from the information scanned from the QRC image. At block 6003, the web page is transmitted from a QRC server to the web browser of the mobile communication device. The web page has an input block for inputting a phone number of the mobile communication device. At block 6004, the phone number of the mobile communication device is inputted into the input block of the web page. At block 6005, a SAVE command for the web page is generated and the phone number is saved. At block 6006, in reaction to the SAVE command, a cookie is placed on the web browser of the mobile communication device. The cookie comprises the phone number of the mobile communication device. In a preferred embodiment, the phone number is encrypted to prevent unauthorized access to the phone number. At block 6007, also in reaction to the SAVE command, the phone number of the mobile communication device is transmitted to the QRC server. At block 6008, a SMS communication or MMS communication is transmitted to the mobile communication device from the QRC server. The SMS or MMS communication comprises the contact data for the business. The contact data may be text, or a graphics, or both. At block 6009, a pop-up is generated on a display of the mobile communication device. The pop-up comprises a V-card for the business. At block 6010, the V-card is saved in a contact file of the mobile communication device.

Figure 9:
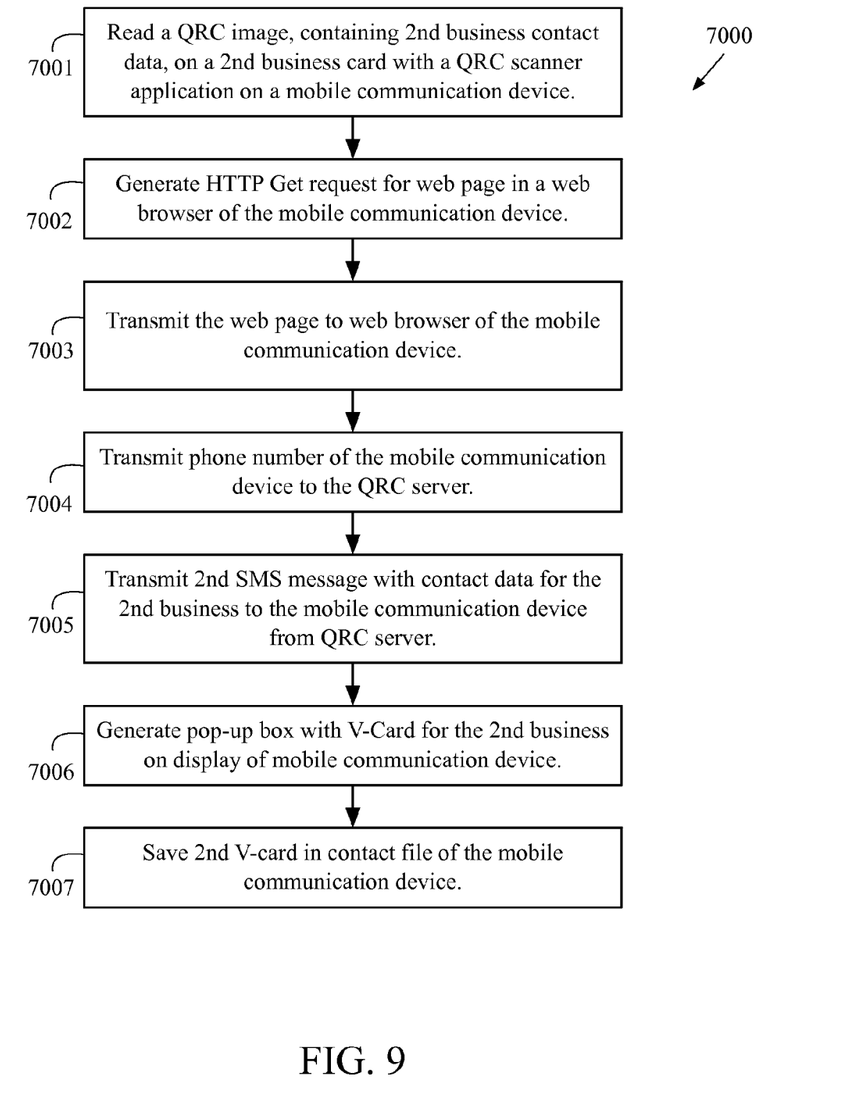
FIG. 9 is a flow chart for obtaining contact information from a business card with a QRC to a mobile communication device.

A flow chart of a method 7000 for transferring business card data to a mobile communication device that has previously received business card data from a QRC server is shown in FIG. 9. At block 7001, a QRC image on a second business card is read with a QRC scanner application on a mobile communication device. The QRC image comprises contact data for the second business. At block 7002, a HTTP get request for a web page is generated in a web browser of the mobile communication device from the information scanned from the QRC image. At block 7003, the web page is transmitted from a QRC server to the web browser of the mobile communication device. At block 7004, the phone number of the mobile communication device is transmitted to the QRC server. The phone number resides in a cookie in the web browser of the mobile communication. Upon receiving the web page from the QRC server, the phone number is transmitted to the QRC server. At block 7005, a second SMS message or MMS message is transmitted to the mobile communication device from the QRC server. The SMS or MMS message comprises the contact data for the business. The contact data may be text, or a graphics, or both. At block 7006, a pop-up is generated on a display of the mobile communication device. The pop-up comprises a V-card for the second business. At block 7007, the V-card is saved in a contact file of the mobile communication device.

Figure 11:
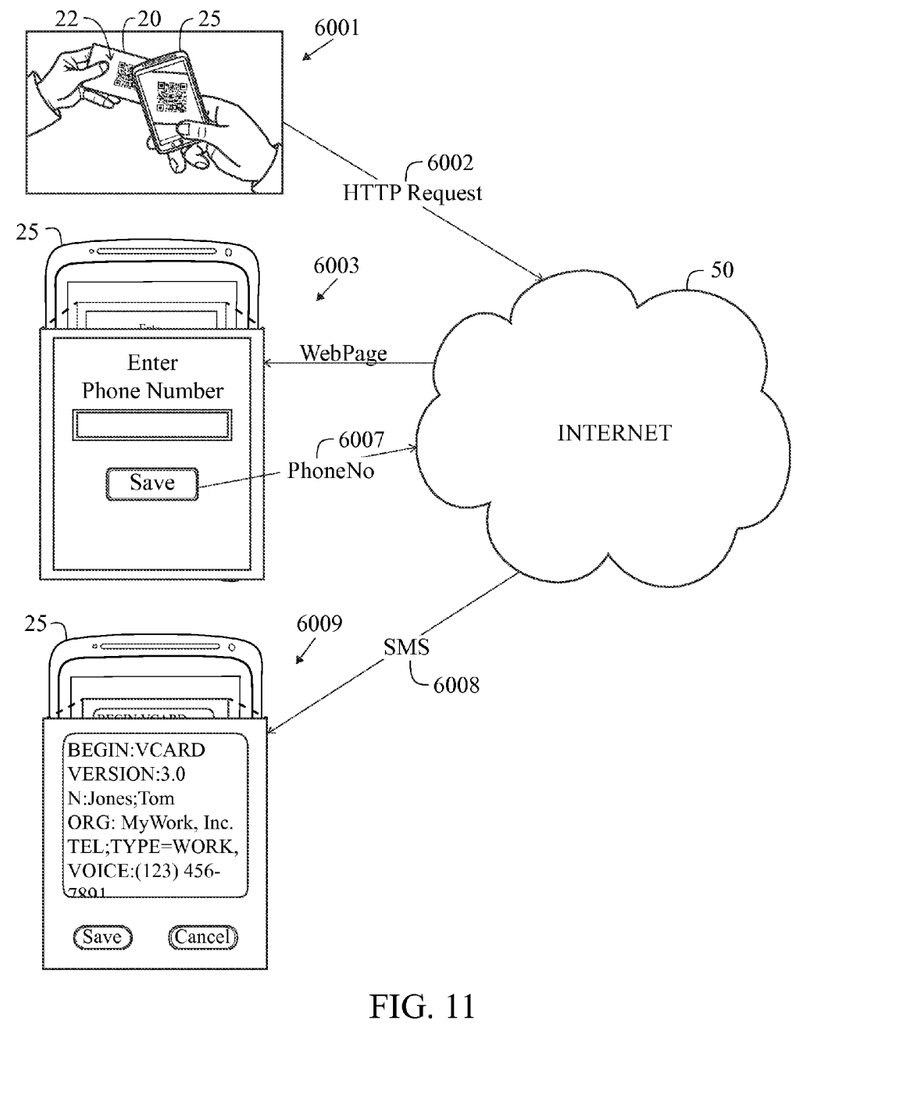
FIG. 11 illustrates an upload of contact data from an SMS text sent from a website for the business of the business card to a mobile communication device, in which the website is accessed through a URL decoded from a QRC image of the business card.

A system for transferring business card information is shown in FIG. 11. The system includes QRC server and communications network server located in the Internet 50. As shown in illustration block 6001, a QR code image 30 on a business card 20 is read with a QR code scanner application 75 on a mobile communication device 25. The QR code image 30 comprises contact data for the business. A HTTP get request 6002 for a web page is generated in a web browser of the mobile communication device 25 from the information scanned from the QR code image 30 and sent over the internet 50 to the QRC server. At 6003, web page is transmitted from a QRC server to the web browser of the mobile communication device 25. The web page has an input block for inputting a phone number of the mobile communication device 25. The phone number of the mobile communication device 25 is inputted into the input block of the web page. A SAVE command for the web page is generated and the phone number is saved. In reaction to the SAVE command, a cookie is placed on the web browser of the mobile communication device 25. The cookie comprises the phone number of the mobile communication device 25. In a preferred embodiment, the phone number is encrypted to prevent unauthorized access to the phone number. Also in reaction to the SAVE command, the phone number of the mobile communication device is transmitted 6007 to the QRC server. A SMS communication 6008 or MMS communication is transmitted to the mobile communication device 25 from the QRC server. The SMS or MMS communication comprises the contact data for the business. The contact data may be text, or a graphics, or both. At 6009, a pop-up is generated on a display of the mobile communication device. The pop-up comprises a V-card for the business. The V-card is saved in a contact file of the mobile communication device.

Figure 12:
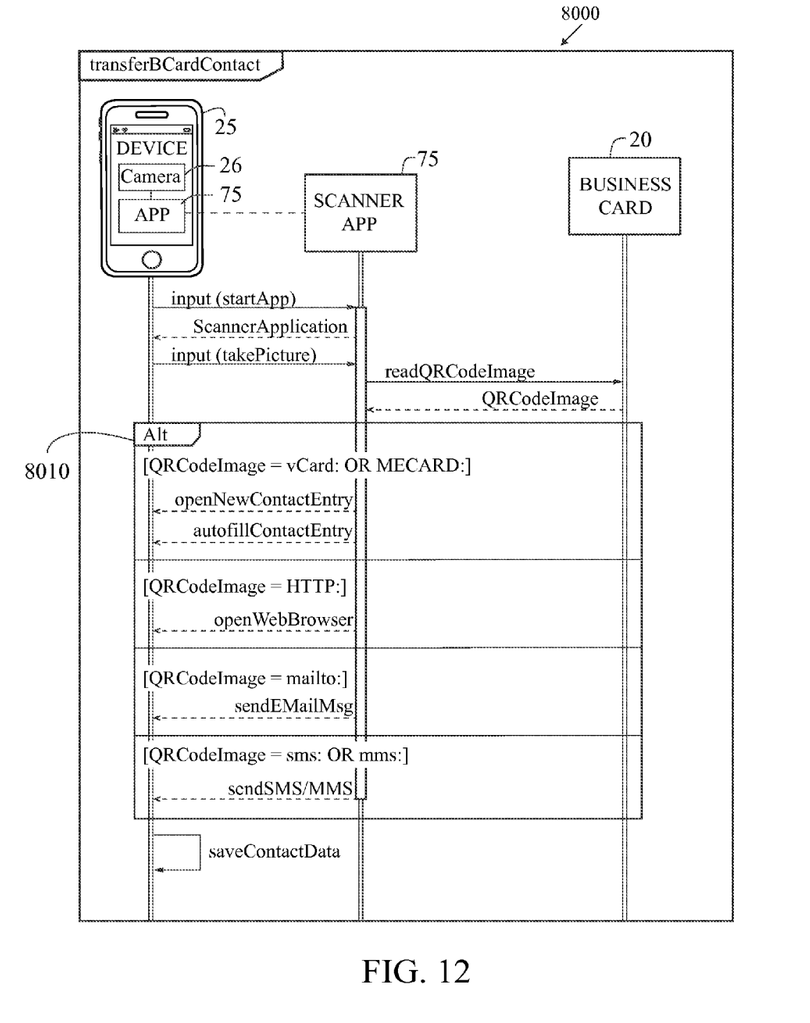
FIG. 12 is a sequence diagram an upload of contact data directly from the QRC image of the business card to a mobile communication device.

FIG. 12 illustrates a sequence diagram for transferring business card data to a mobile communication device 25. The mobile communication device 25 includes a camera 26 and a scanner application 75. An end user of the mobile communication device 25 opens the scanner application 75. The camera 26 of the mobile communication device 25 read the QR code image on the business card 20. The QR code image comprises contact data for the business. The scanner application opens a new contact entry in the contacts of the mobile communication device 25. Preferably, a HTTP get request for a web page is generated in a mobile web browser of the mobile communication device 25 from the information scanned from the QR code image. The web page is transmitted from a QRC server to the web browser of the mobile communication device 25. The web page has an input block for inputting a phone number of the mobile communication device 25. The phone number of the mobile communication device 25 is inputted into the input block of the web page. A SAVE command for the web page is generated and the phone number is saved. In reaction to the SAVE command, a cookie is placed on the web browser of the mobile communication device 25. The cookie comprises the phone number of the mobile communication device 25. In a preferred embodiment, the phone number is encrypted to prevent unauthorized access to the phone number. Also in reaction to the SAVE command, the phone number of the mobile communication device 25 is transmitted to the QRC server. A SMS communication or MMS communication is transmitted over a mobile communications network to the mobile communication device 25 from the QRC server utilizing the phone number of the mobile communication device 25. The SMS or MMS communication comprises the contact data for the business. The contact data may be text, or a graphics, or both. A pop-up is generated on a display of the mobile communication device 25. The pop-up comprises a V-card for the business. The V-card is saved in a contact file of the mobile communication device 25.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for transferring business card information, the method comprising:

reading a quick reader code (QRC) image on a business card with a QRC scanner application on a mobile communication device, the QRC image comprising a uniform resource locator (URL) comprising contact data for the business;

generating a HTTP get request for the URL in a web browser of the mobile communication device;

transmitting a web page associated with the URL from a QRC server to the web browser of the mobile communication device, the web page having an input block for inputting a phone number of the mobile communication device;

inputting the phone number into the input block of the web page;

transmitting the phone number of the mobile communication device to a QRC server;

transmitting a short message service (SMS) message or a multimedia messaging service (MMS) message to the mobile communication device from the QRC server, the MMS message or the SMS message comprising the contact data for the business; and uploading the contact data for the business to the contact section of the mobile communication device.

2. The method according to claim 1 wherein the contact data for the business comprises a contact name, a contact title, a business name, a business address, a business phone number, and a business email.

3. A system for transferring business card information, the system comprising:

a mobile communication device with a QRC scanner application;

a QRC server;

a business card comprising text and graphics with a contact name, a contact title, a business name, a business address, a business phone number, and a business email, and a QRC image comprising means for uploading contact data for the business card through use of a QRC scanner, the contact data comprising contact name, a contact title, a business name, a business address, a business phone number, and a business email;

wherein the QRC scanner application on the mobile communication device is configured to read the QRC image on the business card;

wherein the QRC scanner application is configured to generate a HTTP get request for a web page in a web browser of the mobile communication device;

wherein the QRC scanner application is configured to transmit the web page to the web browser of the mobile communication device, the web page having an input block for inputting a phone number of the mobile communication device;

wherein the QRC scanner application is configured to transmit the phone number of the mobile communication device to the QRC server;

wherein the QRC server is configured to transmit a SMS message to the mobile communication device, the SMS message comprising the contact data for the business;

wherein the SMS message is configured to generate a pop-up on a display of the mobile communication device, the pop-up comprising a V-card for the business; and wherein the QRC scanner application is configured to save the V-card in a contact file of the mobile communication device.

4. The system according to claim 3 wherein the mobile communication device is a mobile phone or a tablet computer.

* * * * *